United States Patent Office 2,801,904
Patented Aug. 6, 1957

2,801,904

IMPROVED METHOD FOR OBTAINING PYROSULFURYL FLUORIDE FROM CALCIUM FLUORIDE AND SULFUR TRIOXIDE

Earl L. Muetterties, Hockessin, Del., assignor to E. I. du Pont de Nemours and Company, Wilmington, Del., a corporation of Delaware No Drawing. Application May 31, 1955,
Serial No. 512,277

7 Claims. (Cl. 23—203)

This invention relates to a new and improved method for preparing pyrosulfuryl fluoride. More particularly this invention relates to a process for obtaining pyrosulfuryl fluoride from readily available raw materials.

Pyrosulfuryl fluoride ($S_2O_5F_2$) is an important intermediate in the preparation of many sulfur oxyfluorides and fluorosulfonates. For example, it can be pyrolyzed at a temperature of 200° C. and above to thionyl fluoride and to sulfuryl fluoride as disclosed and claimed in my U. S. patent application Serial No. 501,737, filed April 15, 1955. This latter compound, sulfuryl fluoride, can be converted to fluorocarbons by reaction with carbon at elevated temperatures of at least 900° C. as disclosed and claimed in U. S. patent application of Farlow and myself, Serial No. 420,473, filed April 1, 1954, now U. S. Patent No. 2,722,559, issued November 1, 1955. Pyrosulfuryl fluoride can also be reacted with inorganic and organic oxides to form the corresponding fluorosulfonates and fluorsulfonic acid esters. Consequently, it is highly desirable to develop improved economical methods for synthesizing pyrosulfuryl fluoride.

It is an object of this invention to provide a new and improved method for preparing pyrosulfuryl fluoride. A further object is to provide an improved method for preparing pyrosulfuryl fluoride from economically attractive raw materials. Another object is to obtain pyrosulfuryl fluoride from readily available materials by a new and improved method which permits ready separation of pure pyrosulfuryl fluoride in improved yields from the reactant materials. Other objects will appear hereinafter.

These and other objects of this invention are accomplished by the following process for preparing pyrosulfuryl fluoride which comprises heating and reacting calcium fluoride with an excess of sulfur trioxide at a temperature of 100° to 300° C., treating the resultant reaction mixture at a temperature below 80° C. with strong aqueous sulfuric acid, and separating pyrosulfuryl fluoride from the resultant slurry. The pyrosulfuryl fluoride can be separated by decantation or by distillation.

In carrying out the process of this invention, it is essential that a stoichiometric excess of sulfur trioxide be used, i. e., more than two moles of sulfur trioxide must be used for each mole of calcium fluoride. Four moles of sulfur trioxide to one mole of calcium fluoride gives good results, but preferably 7 to 9 moles of sulfur trioxide per mole of calcium fluoride is used since, with these proportions, best yields of pyrosulfuryl fluoride are obtained.

Reaction of the sulfur trioxide with calcium fluoride will take place at temperatures ranging from 100° to 300° C. or more. Preferably a reaction temperature between 125° and 225° C. is employed since better yields are obtained in this range. It is also preferable to use agitation, either stirring or shaking, since this also improves the yield of pyrosulfuryl fluoride.

The reaction pressure is not critical since pyrosulfuryl fluoride can be formed at either atmospheric or superatmospheric pressure. However, since best yields of pyrosulfuryl fluoride are obtained when liquid sulfur trioxide is present in the reaction mixture, it is preferred to carry out the reaction in a closed reaction vessel under the autogenous pressure developed under the heating conditions. Reaction times ranging from 1 to 45 hours can be used. However, since best yields of pyrosulfuryl fluoride are obtained with intermediate reaction times, reaction periods of 4 to 36 hours are preferred.

In order to obtain good yields of pyrosulfuryl fluoride from the reaction mixture obtained by heating calcium fluoride with an excess of sulfur trioxide under the conditions described above, it is necessary to treat the reaction mixture with sufficient strong sulfuric acid, i. e., aqueous sulfuric acid of 70% to 98% concentration, before distilling the pyrosulfuryl fluoride from the mixture. Sufficient aqueous sulfuric acid must be added to the reaction mixture to provide enough water to combine with the sulfur trioxide in the reaction mixture. Very satisfactory results are obtained with sulfuric acid of about 90–93% concentration. This treatment of the reaction mixture with aqueous sulfuric acid is carried out at a temperature below 80° C., and preferably at about 0° C. since the absorption of the sulfur trioxide by the sulfuric acid is exothermic.

After treatment with concentrated sulfuric acid, the reaction mixture is subjected to distillation at atmospheric pressure. The distillate is preferably collected in a receiver containing a small amount of sulfuric acid of 95–98% concentration cooled to 0° C. This cold concentrated sulfuric acid dissolves any sulfur trioxide coming over with the pyrosulfuryl fluoride. The pyrosulfuryl fluoride is insoluble in sulfuric acid at this temperature and it can be separated from the cold sulfuric acid by decantation or other conventional means.

The pure pyrosulfuryl fluoride obtained by the process of this invention boils at 51° C., and it does not fume in contact with air. Pyrosulfuryl fluoride is very toxic, hence care should be used in working with it.

The calcium fluoride, sulfur trioxide and sulfuric acid used in the process of this invention can be the materials of good quality available commercially. The process is carried out in reaction vessels constructed of corrosion-resistant materials capable of withstanding the pressures developed in the reaction. Stainless steel reaction vessels are quite satisfactory.

The process of this invention is illustrated in further detail in the following examples in which the proportions of ingredients are expressed in parts by weight unless otherwise specified.

*Example I*

A stainless steel-lined reaction vessel capable of withstanding superatmospheric pressures is charged with 39 parts (0.5 mole) of calcium fluoride and 160 parts (2.0 moles) of sulfur trioxide. The vessel is closed, agitated by shaking, and heated at 200° C. for a period of 24 hours.

The reaction vessel is cooled by placing it in an ice bath, and 288 parts of aqueous sulfuric acid of about 92% concentration is slowly introduced into the reaction vessel under pressure. After all the acid is added, the vessel is opened, and the resultant slurry is removed from the vessel.

The slurry is subjected to distillation at atmospheric pressure, and the distillate boiling in the range 44° to 70° C. is treated with concentrated sulfuric acid (95–98%). After treatment with the sulfuric acid, there are two layers present. The top layer is separated from the lower sulfuric acid layer and is redistilled. This material boils at 51° C. and is pyrosulfuryl fluoride. The yield of pyrosulfuryl fluoride is 15 parts, corresponding to a conversion of 16.5% based on calcium fluoride charged. This pyrosulfuryl fluoride is identified by its infrared absorption spectrum.

*Example II*

Following the procedure described in Example I, 39 parts of calcium fluoride and 160 parts of sulfur trioxide are reacted at 200° C. under autogenous pressure for a period of 12 hours. The reaction product is treated with 92% sulfuric acid and is worked up in the manner described in Example I. On distillation, there is obtained 6.9 parts, corresponding to a conversion of 7.6%, of pyrosulfuryl fluoride. This product is also identified by its infrared absorption spectrum.

*Example III*

A reaction vessel of the type described in Example I is charged with 39 parts of calcium fluoride and 160 parts of sulfur trioxide. The closed reaction vessel is heated at 100° C. under autogenous pressure with continuous agitation for a period of 21 hours. At the end of this time, the reactor is cooled to below 0° C., and 182 parts of aqueous 92% sulfuric acid is added to the reaction mixture. The reactor is closed and allowed to warm to room temperature (about 25° C.). The resultant slurry is removed from the reaction vessel and is subjected to distillation. There is obtained about 0.1–0.2 part of pyrosulfuryl fluoride, which is identified by its characteristic odor.

*Example IV*

A mixture of 39 parts of calcium fluoride and 160 parts of sulfur trioxide is reacted as described in the preceding example with the exception that the reaction mixture is maintained at 300° C. under autogenous pressure for a period of six hours with no agitation. After treatment with 92% sulfuric acid and distillation as described in the preceding examples, there is obtained about 1 part of pyrosulfuryl fluoride, which is identified by its infrared absorption spectrum.

*Example V*

A mixture of 39 parts of calcium fluoride and 160 parts of sulfur trioxide is reacted as described in Example I (200° C. for 24 hours) with the exception that 276 parts of concentrated sulfuric acid (95–98%) is added to the cooled reaction mixture instead of 92% sulfuric acid. Distillation of the resultant slurry yields 11 parts, corresponding to a yield of 12.1% of pyrosulfuryl fluoride, which is identified by its infrared absorption spectrum.

*Example VI*

A mixture of 39 parts of calcium fluoride and 160 parts of sulfur trioxide is reacted by the procedure described in Example I at 150° C. for a period of 24 hours. After the reaction vessel is cooled to 0° C., 182 parts of aqueous 92% sulfuric acid is added to the reaction mixture. The reaction vessel is then closed and allowed to warm to room temperature (about 25° C.). Distillation of the resultant slurry gives 7.4 parts, corresponding to a yield of 8.1%, of pyrosulfuryl fluoride. This product is identified by its infrared absorption spectrum.

*Example VII*

Following the general procedure described in Example I, a mixture of 39 parts (0.5 mole) of calcium fluoride and 280 parts (3.5 moles) of sulfur trioxide is reacted at 200° C. for 24 hours with continuous agitation. After treatment of the cooled reaction mixture with 364 parts of aqueous 92% sulfuric acid and distillation of the resultant slurry, there is obtained 41 parts of pyrosulfuryl fluoride. This corresponds to a yield of 45%, based on calcium fluoride.

*Example VIII*

A reaction vessel of the type described in Example I is charged with 39 parts of calcium fluoride, 165 parts of sulfur trioxide and 5 parts of boron trifluoride (catalyst). The mixture is heated under autogenous pressure at 200° C. for 24 hours with continuous agitation. The resultant reaction mixture is treated, after cooling to 0° C., with 182 parts of aqueous 92% sulfuric acid, and the resultant slurry is subjected to distillation as in the preceding examples. There is obtained 23 parts of pyrosulfuryl fluoride. This corresponds to a yield of 25.3%, based on the calcium fluoride.

As shown by this example a catalyst, such as boron trifluoride, can be used in the reaction to increase the yield of pyrosulfuryl fluoride.

The treatment of the reaction mixture of calcium fluoride and sulfur trioxide with strong sulfuric acid prior to distillation of the product is essential in obtaining practical yields of pyrosulfuryl fluoride. This is shown conclusively by the fact that very low yields of pyrosulfuryl fluoride are obtained when the reaction of calcium fluoride and sulfur trioxide is carried out under conditions identical in all respects with those described in Example I, except that the reaction mixture is not treated with strong sulfuric acid prior to distillation. Under these conditions the reaction mixture forms a very hard cake, which is extremely difficult to remove from the reaction vessel. In three experiments carried out without this sulfuric acid treatment, yields of pyrosulfuryl fluoride of only 1 to 4.4% are obtained. In contrast, a yield of 16.5% is obtained in Example I which employs the sulfuric acid treatment steps.

The process of this invention is an improved method for preparing pyrosulfuryl fluoride from extremely low-cost raw materials.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing pyrosulfuryl fluoride which comprises heating and reacting calcium fluoride with more than two moles of sulfur trioxide per mole of calcium fluoride at a temperature of 100 to 300° C., treating the resultant reaction mixture at a temperature below 80° C. with concentrated sulfuric acid in water, and separating pyrosulfuryl fluoride therefrom by distillation.

2. Process for preparing pyrosulfuryl fluoride which comprises heating and reacting calcium fluoride with more than two moles of sulfur trioxide per mole of calcium fluoride in contact with a boron trifluoride catalyst at a temperature of 100 to 300° C., treating the resultant reaction mixture at a temperature below 80° C. with concentrated sulfuric acid in water, and separating pyrosulfuryl fluoride therefrom by distillation.

3. Process for preparing pyrosulfuryl fluoride which comprises heating and reacting calcium fluoride with more than two moles of sulfur trioxide per mole of calcium fluoride at a temperature of 100 to 300° C., treating the resultant reaction mixture at a temperature below 80° C. with concentrated sulfuric acid having a concentration of 70 to 98% in water, and distilling pyrosulfuryl fluoride therefrom.

4. Process for preparing pyrosulfuryl fluoride which comprises heating and reacting calcium fluoride with at least four moles of sulfur trioxide per mole of calcium fluoride at a temperature of 125 to 225° C., treating the resultant reaction mixture at a temperature below 80° C. with concentrated sulfuric acid having a concentration of 70 to 98% in water, and distilling pyrosulfuryl fluoride therefrom.

5. Process for preparing pyrosulfuryl fluoride which comprises heating and reacting calcium fluoride with at least four moles of sulfur trioxide per mole of calcium fluoride in contact with a boron trifluoride catalyst at a temperature of 125 to 225° C., treating the resultant reaction mixture at a temperature below 80° C. with concentrated sulfuric acid having a concentration of 70 to 98% in water, and distilling pyrosulfuryl fluoride therefrom.

6. Process for preparing pyrosulfuryl fluoride which comprises heating and reacting calcium fluoride with from 7 to 9 moles of sulfur trioxide per mole of calcium fluoride at a temperature of 125 to 225° C., treating the resultant reaction mixture at about 0° C. with concentrated sulfuric acid having a concentration of 90 to 93% in water, and distilling pyrosulfuryl fluoride therefrom.

7. Process for preparing pyrosulfuryl fluoride which comprises heating and reacting calcium fluoride with at least four moles of sulfur trioxide per mole of calcium fluoride under autogenous pressure at a temperature of 100 to 300° C., treating the resultant reaction mixture at about 0° C. with concentrated sulfuric acid having a concentration of 70 to 98% in water, and distilling pyrosulfuryl fluoride therefrom.

References Cited in the file of this patent

Chem. Abs. 40, 1946, p. 2948.
Chem. Abs. 46, 1952, p. 3443.
Chem. Abs. 47, 1953, pp. 2442 and 2443.